United States Patent
Chen et al.

(10) Patent No.: US 10,186,993 B2
(45) Date of Patent: Jan. 22, 2019

(54) MOTOR CONTROL SYSTEM AND MOTOR DRIVING CIRCUIT

(71) Applicant: ANPEC ELECTRONICS CORPORATION, Hsinchu (TW)

(72) Inventors: Kun-Min Chen, Hsinchu (TW); I-Lin Chiu, New Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 11 days.

(21) Appl. No.: 15/663,673

(22) Filed: Jul. 28, 2017

(65) Prior Publication Data

US 2018/0269814 A1      Sep. 20, 2018

(30) Foreign Application Priority Data

Mar. 17, 2017   (TW) .............................. 106108948 A

(51) Int. Cl.
*H02P 6/16*      (2016.01)
*H02P 6/08*      (2016.01)

(52) U.S. Cl.
CPC ................ *H02P 6/16* (2013.01); *H02P 6/085* (2013.01)

(58) Field of Classification Search
CPC ........................................................ H02P 6/16
See application file for complete search history.

(56) References Cited

U.S. PATENT DOCUMENTS

| | | | | |
|---|---|---|---|---|
| 5,463,299 A * | 10/1995 | Futami | ...................... | H02P 6/06 318/400.13 |
| 6,276,192 B1 * | 8/2001 | Sim | ........................ | B60H 1/008 422/94 |
| 7,667,351 B2 * | 2/2010 | Marwali | .................. | H02J 9/062 307/87 |
| 2008/0298856 A1 * | 12/2008 | Koike | .................. | G03G 15/167 399/302 |
| 2011/0310954 A1 * | 12/2011 | Sawaoka | .................. | H03K 7/08 375/238 |

FOREIGN PATENT DOCUMENTS

TW          201208246 A         2/2012

* cited by examiner

*Primary Examiner* — Kawing Chan
*Assistant Examiner* — Bradley Brown
(74) *Attorney, Agent, or Firm* — Li & Cai Intellectual Property (USA) Office

(57) ABSTRACT

A motor control system includes a motor driving circuit and a motor. The motor driving circuit includes a control module, a PWM signal detecting module, a transient state detecting module and a driving module. The PWM signal detecting module is electrically connected to the control module to receive a PWM signal and to convert the PWM signal into a first digital PWM control signal. The transient state detecting module provides a second digital PWM control signal to the control module according to the first digital PWM control signal at a first time point and the first digital PWM control signal at a second time point. The driving module receives at least one driving signal from the control module. The control module determines whether to turn off a low side switch of the driving module according to the second digital PWM control signal.

10 Claims, 4 Drawing Sheets

MOTOR CONTROL SYSTEM AND MOTOR DRIVING CIRCUIT

BACKGROUND OF THE INVENTION

1. Field of the Invention

The present disclosure relates to a motor control system; in particular, to a motor control system that can determine a transient state of a motor and accordingly control the rotation speed of the motor.

2. Description of Related Art

Usually, when the rotation speed of a motor is controlled by using a complementary-type Pulse Width Modulation (PWM) control system and the rotation speed of the motor changes from a high rotation speed to a low rotation speed, a complementary switch in the system will not be turned on. Thus, a control circuit in the system consumes more power and has lower efficiency. In addition, in the system, if a current comparator is configured as a zero current detector, the current comparator is required to work precisely. Thus, in this case, the circuit of the system will be complex. Also, there may be a time delay during the rotation speed control for the motor, which may cause a reverse current.

Therefore, it is necessary to develop a motor control system that has a simpler system circuit and that can determine a transient state of a motor and accordingly control the rotation speed of the motor.

SUMMARY OF THE INVENTION

The present disclosure provides a motor control system. This motor control system includes a motor driving circuit and a motor. The motor driving circuit has a first output end and a second output end, and includes a control module, a PWM signal detecting module, a transient state detecting module and a driving module. The PWM signal detecting module is electrically connected to the control module, and is configured to receive a PWM signal and convert the PWM signal to a first digital PWM control signal. The transient state detecting module is configured to provide a second digital PWM control signal to the control module according to the first digital PWM control signal at a first time point and the first digital PWM control signal at a second time point. The driving module is electrically connected to the control module, and is configured to receive at least one driving signal from the control module. The driving module is electrically connected to the first output end and the second output end of the motor driving circuit. The motor is electrically connected to the first output end and the second output end of the motor driving circuit. The control module controls the rotation speed of the motor by using the driving module. The control module determines whether to turn off a low side switch of the driving module according to the second digital PWM control signal.

In one embodiment of the motor control system provided by the present disclosure, the driving module includes a first high side switch, a second high side switch, a first low side switch and a second low side switch. The first high side switch has a first end, a second and a third end. The first end of the first high side switch is coupled to a direct voltage, the second end of the first high side switch is electrically connected to the control module to receive a first high side driving signal, and the third end of the first high side switch is electrically connected to the first output end of the motor driving circuit. The second high side switch has a first end, a second and a third end. The first end of the second high side switch is coupled to the direct voltage, the second end of the second high side switch is electrically connected to the control module to receive a second high side driving signal from the control module, and the third end of the second high side switch is electrically connected to the second output end of the motor driving circuit. The first low side switch has a first end, a second and a third end. The first end of the first low side switch is electrically connected to the third end of the first high side switch and the first output end of the motor driving circuit, the second end of the first low side switch is electrically connected to the control module to receive a first low side driving signal from the control module, and the third end of the first low side switch is grounded. The second low side switch has a first end, a second and a third end. The first end of the second low side switch is electrically connected to the third end of the second high side switch and the second output end of the motor driving circuit, and the second end of the second low side switch is electrically connected to the control module to receive a second low side driving signal from the control module. The control module determines whether to turn off the first low side switch of the driving module according to the second digital PWM control signal.

In one embodiment of the motor control system provided by the present disclosure, the transient state detecting module includes a converting unit, a comparison unit, a first temporary storage unit and a second temporary storage unit. The comparison unit is electrically connected to the converting unit. The first temporary storage unit is electrically connected to the converting unit to receive the first digital PWM control signal and to convert the first digital PWM control signal into a first timing digital PWM control signal. The second temporary storage unit is electrically connected to the converting unit to receive the first digital PWM control signal and to convert the first digital PWM control signal at the second time point into a second timing digital PWM control signal. The comparison unit outputs the second digital PWM control signal according to a difference between the first timing digital PWM control signal and the second timing digital PWM control signal. The second time point is larger than the first time point.

In one embodiment of the motor control system provided by the present disclosure, the transient state detecting module further includes a timer. The timer is configured to set a predetermined time. The control module resets the second digital PWM control signal according to the predetermined time set by the timer.

In one embodiment of the motor control system provided by the present disclosure, the converting unit of the transient state detecting module outputs the second digital PWM control signal at high level to the control module when the second timing digital PWM control signal minus the first timing digital PWM control signal is larger than zero and also larger than a PWM threshold, such that the control module outputs a cut-off signal to the second end of the first low side switch to turn off the first low side switch.

In one embodiment of the motor control system provided by the present disclosure, the converting unit of the transient state detecting module outputs the second digital PWM control signal at low level to the control module when the second timing digital PWM control signal minus the first timing digital PWM control signal is larger than zero but smaller than a PWM threshold, such that the control module outputs a PWM signal to the second end of the first low side switch.

In one embodiment of the motor control system provided by the present disclosure, the converting unit of the transient state detecting module outputs no signal to the control module when the second timing digital PWM control signal minus the first timing digital PWM control signal is smaller than zero.

In one embodiment of the motor control system provided by the present disclosure, the motor driving circuit further includes a position detecting module. The position detecting module is electrically connected to a Hall sensing end of the motor driving circuit to receive a phase variation signal of the motor. The PWM signal detecting module is electrically connected to a PWM signal receiving end of the motor driving circuit to receive the PWM signal.

The present disclosure further provides a motor driving circuit. The motor driving circuit has a first output end and a second output end. The first output end and the second output end are electrically connected to a motor, and the motor driving circuit includes a control module, a PWM signal detecting module, a transient state detecting module and a driving module. The PWM signal detecting module is electrically connected to the control module, and is configured to receive a PWM signal and to convert the PWM signal into a first digital PWM control signal. The transient state detecting module is configured to provide a second digital PWM control signal to the control module according to the first digital PWM control signal at a first time point and the first digital PWM control signal at a second time point. The driving module is electrically connected to the control module, and is configured to receive at least one driving signal from the control module. The driving module is electrically connected to the first output end and the second output end of the motor driving circuit. The control module controls the rotation speed of the motor by using the driving module. The control module determines whether to turn off a low side switch of the driving module according to the second digital PWM control signal.

In one embodiment of the motor driving circuit provided by the present disclosure, the driving module includes a first high side switch, a second high side switch, a first low side switch and a second low side switch. The first high side switch has a first end, a second and a third end. The first end of the first high side switch is coupled to a direct voltage, the second end of the first high side switch is electrically connected to the control module to receive a first high side driving signal, and the third end of the first high side switch is electrically connected to the first output end of the motor driving circuit. The second high side switch has a first end, a second and a third end. The first end of the second high side switch is coupled to the direct voltage, the second end of the second high side switch is electrically connected to the control module to receive a second high side driving signal from the control module, and the third end of the second high side switch is electrically connected to the second output end of the motor driving circuit. The first low side switch has a first end, a second and a third end. The first end of the first low side switch is electrically connected to the third end of the first high side switch and the first output end of the motor driving circuit, the second end of the first low side switch is electrically connected to the control module to receive a first low side driving signal from the control module, and the third end of the first low side switch is grounded. The second low side switch has a first end, a second and a third end. The first end of the second low side switch is electrically connected to the third end of the second high side switch and the second output end of the motor driving circuit, and the second end of the second low side switch is electrically connected to the control module to receive a second low side driving signal from the control module. The control module determines whether to turn off the first low side switch of the driving module according to the second digital PWM control signal.

In one embodiment of the motor driving circuit provided by the present disclosure, the transient state detecting module includes a converting unit, a comparison unit, a first temporary storage unit and a second temporary storage unit. The comparison unit is electrically connected to the converting unit. The first temporary storage unit is electrically connected to the converting unit to receive the first digital PWM control signal and to convert the first digital PWM control signal into a first timing digital PWM control signal. The second temporary storage unit is electrically connected to the converting unit to receive the first digital PWM control signal and to convert the first digital PWM control signal at the second time point into a second timing digital PWM control signal. The comparison unit outputs the second digital PWM control signal according to a difference between the first timing digital PWM control signal and the second timing digital PWM control signal. The second time point is larger than the first time point.

In one embodiment of the motor driving circuit provided by the present disclosure, the transient state detecting module further includes a timer. The timer is configured to set a predetermined time. The control module resets the second digital PWM control signal according to the predetermined time set by the timer.

In one embodiment of the motor driving circuit provided by the present disclosure, the converting unit of the transient state detecting module outputs the second digital PWM control signal at high level to the control module when the second timing digital PWM control signal minus the first timing digital PWM control signal is larger than zero and also larger than a PWM threshold, such that the control module outputs a cut-off signal to the second end of the first low side switch to turn off the first low side switch.

In one embodiment of the motor driving circuit provided by the present disclosure, the converting unit of the transient state detecting module outputs the second digital PWM control signal at low level to the control module when the second timing digital PWM control signal minus the first timing digital PWM control signal is larger than zero but smaller than a PWM threshold, such that the control module outputs a PWM signal to the second end of the first low side switch.

In one embodiment of the motor driving circuit provided by the present disclosure, the converting unit of the transient state detecting module outputs no signal to the control module when the second timing digital PWM control signal minus the first timing digital PWM control signal is smaller than zero.

In one embodiment of the motor driving circuit provided by the present disclosure, the motor driving circuit further includes a position detecting module. The position detecting module is electrically connected to a Hall sensing end of the motor driving circuit to receive a phase variation signal of the motor. The PWM signal detecting module is electrically connected to a PWM signal receiving end of the motor driving circuit to receive the PWM signal.

The motor control system provided by the present disclosure can accurately predict the timing when the rotation speed of the motor changes from a high rotation speed to a low rotation speed by converting a PWM control signal into a digital PWM control signal. When it is determined that the rotation speed of the motor changes from a high rotation speed to a low rotation speed, a control module in the motor control system transmits a cut-off signal to a driving module in the motor control system to avoid a reverse current. In addition, the circuit area of the motor driving circuit in the motor control system provided by the present disclosure is smaller than a conventional motor driving circuit, thus reducing the cost for developing and producing the motor driving circuit of the present disclosure.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

Figure 1:
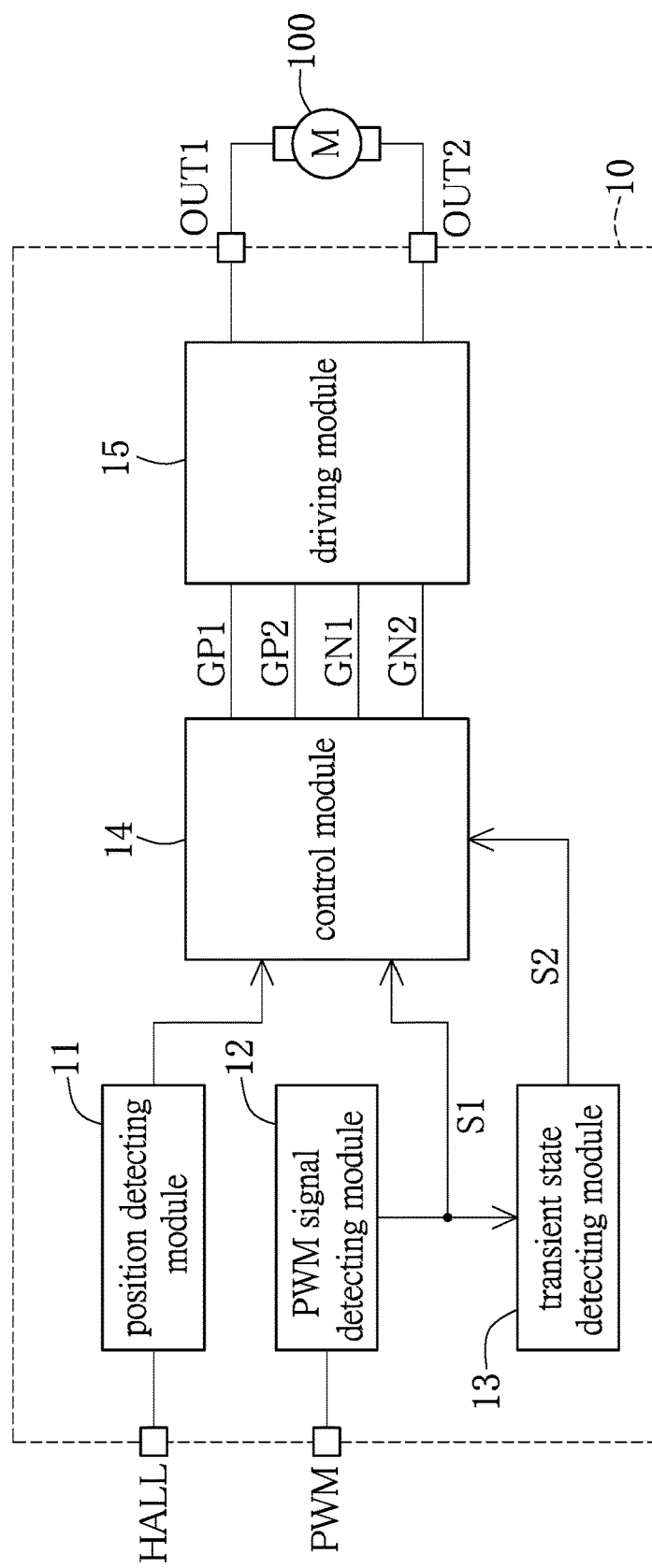
FIG. 1 shows a schematic diagram of a motor control system of one embodiment of the present disclosure.
Figure 2:
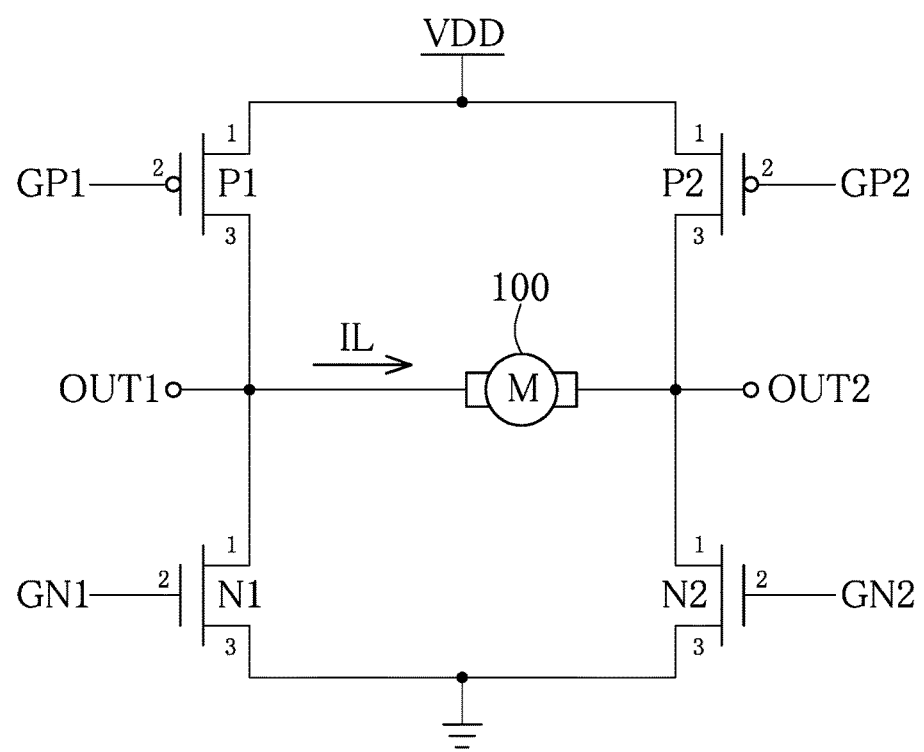
FIG. 2 shows a partial schematic diagram of a motor control system of one embodiment of the present disclosure.

Referring to FIG. 1 and FIG. 2, a schematic diagram and a partial schematic diagram of a motor control system of one embodiment of the present disclosure are shown.

The motor control system 1 includes a motor driving circuit 10 and a motor 100. The motor driving circuit 10 includes a position detecting module 11, a PWM signal detecting module 12, a transient state detecting module 13, a control module 14 and a driving module 15.

The motor driving circuit 10 has a Hall sensing end HALL, a PWM signal receiving end PWM, a first output end OUT1 and a second output end OUT2. The first output end OUT1 and the second output end OUT2 of the motor driving circuit 10 are both electrically connected to the motor 100.

As shown in FIG. 1, the position detecting module 11, the PWM signal detecting module 12, the transient state detecting module 13 and the driving module 15 are all electrically connected to the control module 14. In addition, the PWM signal detecting module 12 is further electrically connected to the transient state detecting module 13.

The position detecting module 11 is electrically connected to the Hall sensing end HALL to detect a phase variation during the rotation of the motor 100. Usually, a HALL sensor is configured on the motor 100 to detect the phase variation of the motor 100 and to provide a speed signal to the control module 14. The PWM signal detecting module 12 receives a control signal from a control circuit at a remote system (not shown) and converts the control signal into a digital PWM signal, such as a PWM control signal having a resolution of 256. In this case, the PWM signal is in a digital form but not in an analog form. The PWM control signal having a resolution of 256 is a 8-bits digital PWM control signal, which is often represented by DUTY[7:0]. It should be noted that, the above mentioned control signal from a control circuit in a remote system (not shown) is a PWM signal.

The transient state detecting module 13 receives a first digital PWM control signal S1 from the PWM signal detecting module, and determines the transient state of the motor 100 for controlling the rotation speed of the motor 100.

The control module 14 receives a speed signal from the position detecting module 11 and receives the first digital PWM control signal S1 from the PWM signal detecting module 12. The control module 14 outputs a first high side driving signal GP1, a second high side driving signal GP2, a first low side driving signal GN1 or a second low side driving signal GN2 according to the first digital PWM control signal S1. In this embodiment, the first high side driving signal GP1, the second high side driving signal GP2, the first low side driving signal GN1 and the second low side driving signal GN2 can be a turn-on signal ON, a cut-off signal OFF or a PWM signal, and is not limited thereto.

The driving module 15 includes a first high side switch P1, a second high side switch P2, a first low side switch N1 and a first low side switch N2.

As shown in FIG. 2, the first end of the first high side switch P1 and the first end of the second high side switch P2 are coupled to a direct voltage VDD. The second end of the first high side switch P1 is electrically connected to the control module 14 to receive the first high side driving signal GP1. The third end of the first high side switch P1 is electrically connected to the first end of the first low side switch N1 and the first output end OUT1 of the motor driving circuit 10. The second end of the first low side switch N1 is electrically connected to the control module 14 to receive the first low side driving signal GN1. The third end of the first low side switch N1 is grounded. The second end of the second high side switch P2 is electrically connected to the control module 14 to receive the second high side driving signal GP2. The third end of the second high side switch P2 is electrically connected to the first end of the second low side switch N2 and the second output end OUT2 of the motor driving circuit 10. The second of the second low side switch N2 is electrically connected to the control module 14 to receive the second low side driving signal GN2. The third end of the second low side switch N2 is grounded. The first end of the motor 100 is electrically connected to the first output end OUT1 of the motor driving circuit 10, and the second end of the motor 100 is electrically connected to the second output end OUT2 of the motor driving circuit 10. The motor driving circuit 10 outputs an output current IL to the motor 100 through its first output end OUT1 or its second output end OUT2. The switch elements in the driving module 15 form a complementary-type control circuit, and thus the output current IL may flow towards an opposite direction.

In this embodiment, the first high side switch P1 and the second high side switch P2 are P-MOSFETs, and the first low side switch N1 and the second low side switch N2 are N-MOSFETs. It should be noted that, the above mentioned direct voltage VDD is a direct voltage larger than 0V, and can be freely designed with no limitation.

Figure 3:
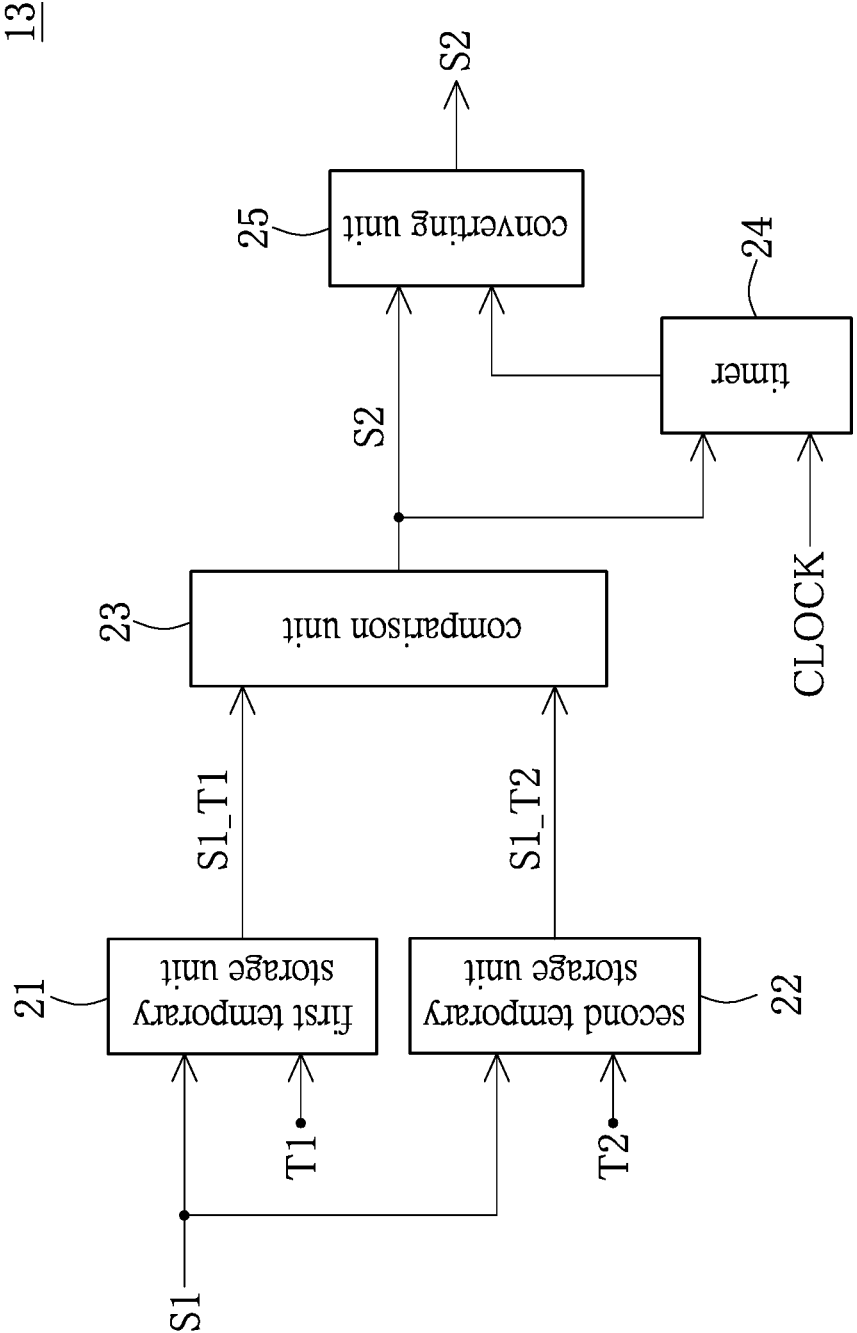
FIG. 3 shows a schematic diagram of a transient state detecting module of one embodiment of the present disclosure.

Referring to FIG. 3, a schematic diagram of a transient state detecting module of one embodiment of the present disclosure is shown. The transient state detecting module 13 includes a first temporary storage unit 21, a second temporary storage unit 22, a comparison unit 23, a timer 24 and a converting unit 25. As shown in FIG. 3, the first temporary storage unit 21 and the second temporary storage unit 22 are electrically connected to the comparison unit 23. The comparison unit 23 is electrically connected to the timer 24 and the converting unit 25.

The transient state detecting module 13 receives the first digital PWM control signal S1 to determine the transient state of the motor 100 for controlling the rotation speed of the motor 100. Specifically speaking, the first digital PWM control signal S1 is transmitted to both of the first temporary storage unit 21 and the second temporary storage unit 22. The first temporary storage unit 21 accesses the first digital PWM control signal S1 at a first time point T1 and this accessed first digital PWM control signal is defined as a first timing digital PWM control signal S1_T1. Also, the first temporary storage unit 21 accesses the first digital PWM control signal S1 at a second time point T2 and this accessed first digital PWM control signal is defined as a second timing digital PWM control signal S1_T2. It should be noted that, there is a time difference Δt between the first time point T1 and the second time point T2. The relationship between the first time point T1 and the second time point T2 can be represented by the following Equation (1).

$$T2 = T1 + \Delta t \quad \text{Equation (1)}$$

According to the Equation (1), the second time point T2 is larger than the first time point T1. In this embodiment, the first time point T1, the second time point T2 and the time difference Δt between the first time point T1 and the second time point T2 can be freely designed with no limitation.

The first temporary storage unit 21 and the second temporary storage unit 22 transmit the first timing digital PWM control signal S1_T1 and the second timing digital PWM control signal S1_T2 to the comparison unit 23 for comparison. After being digitalized, the first timing digital PWM control signal S1_T1 and the second timing digital PWM control signal S1_T2 are considered as two pulse width values. Thus, the comparison unit 23 compares a PWM threshold with a difference between the first timing digital PWM control signal S1_T1 and the second timing digital PWM control signal S1_T2, and then outputs a second digital PWM control signal S2 to the control module 14. In this embodiment, the above mentioned PWM threshold can be freely designed with no limitation.

When the difference between the first timing digital PWM control signal S1_T1 and the second timing digital PWM control signal S1_T2 is larger than the PWM threshold, the converting unit 25 outputs a second digital PWM control signal S2 at high level. In other words, when the second timing digital PWM control signal S1_T2 minus the first timing digital PWM control signal S1_T1 is larger than zero and also larger than the PWM threshold, the converting unit 25 outputs a second digital PWM control signal S2 at high level.

When difference between the first timing digital PWM control signal S1_T1 and the second timing digital PWM control signal S1_T2 is larger than zero but smaller than the PWM threshold, the converting unit 25 outputs a second digital PWM control signal S2 at low level. In other words, when the second timing digital PWM control signal S1_T2 minus the first timing digital PWM control signal S1_T1 is smaller than the PWM threshold, the converting unit 25 outputs a second digital PWM control signal S2 at low level.

In addition, when the difference between the first timing digital PWM control signal S1_T1 and the second timing digital PWM control signal S1_T2 is smaller than zero, it shows that the rotation speed of the motor 100 is increasing. As a result, the converting unit of the transient state detecting module 13 will not transmit any signal to the control module 14.

When the control module 14 receives the second digital PWM control signal S2 at high level, the control module 14 outputs a cut-off signal OFF as the first low side driving signal GN1 to turn off the first low side switch N1.

When the control module 14 receives the second digital PWM control signal S2 at low level, the control module 14 outputs a PWM signal as the first low side driving signal GN1 to drive the first low side switch N1.

For example, if the value of the first timing digital PWM control signal S1_T1 is 256 (100% of the rotation speed) and the value of the second timing digital PWM control signal S1_T2 is 190 (74% of the rotation speed), the difference between the first timing digital PWM control signal S1_T1 and the second timing digital PWM control signal S1_T2 is 66, which is over 20% of the rotation speed (256*20%=51.2). In this case, the transient state detecting module 13 transmits the second digital PWM control signal S2 at high level to the control module 14 for indicating that the motor 100 is about to change its rotation speed from a high rotation speed to a low rotation speed. As a response, the control module 14 transmits a cut-off signal OFF to the second end of the first low side switch N1 to turn off the first low side switch N1. Briefly, according to the second digital PWM control signal S2 from the converting unit 25 of the transient state detecting module 13, the control module 14 will transmit different kinds of first low side driving signals to the second end of the first low side switch N1 in order to avoid a reverse current that may be generated when the rotation speed of the motor is adjusted from a high rotation speed to a low rotation speed.

The timer 24 of the transient state detecting module 13 receives a clock signal CLOCK for counting time. Specifically speaking, the converting unit 25 can be set to output the second digital PWM control signal S2 at high level or low level for a predetermined time interval. For example, the converting unit 25 is set to output the second digital PWM control signal S2 at high level only for a first predetermined time, and after that, the converting unit 25 is set to output the second digital PWM control signal S2 at low level. For another example, the converting unit 25 is set to output the second digital PWM control signal S2 at low level only for a second predetermined time, and after that, the converting unit 25 is set to output the second digital PWM control signal S2 at high level. It should be noted that, the converting unit 25 can be set to output the second digital PWM control signal S2 at high level or low level for any desired time interval, and is not limited thereto.

In this embodiment, the timer 24 can be a SR flip-flop, but the implementation of the timer 24 is not restricted by the present disclosure.

Figure 4:
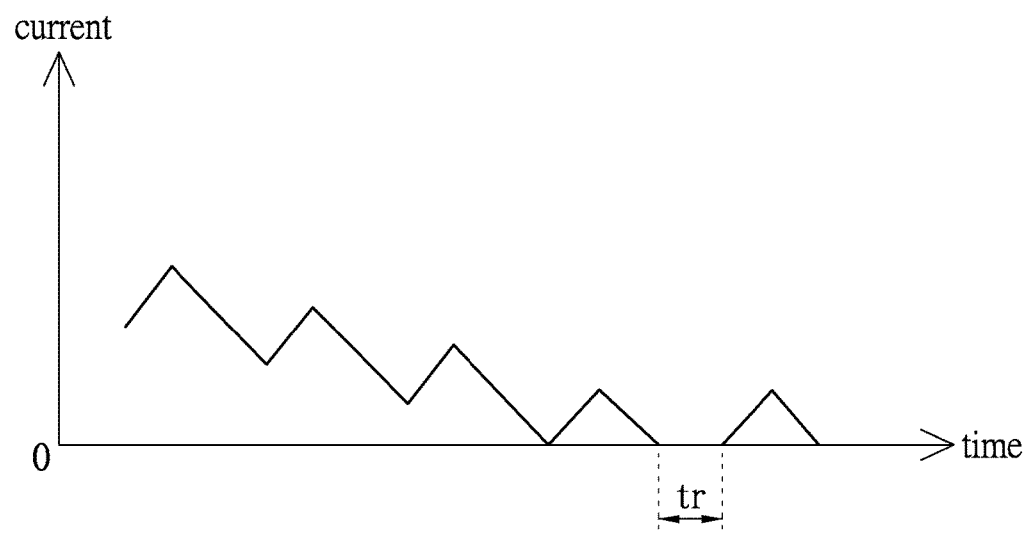
FIG. 4 shows a current curve diagram of a motor control system of one embodiment of the present disclosure.

Referring to FIG. 4, a current curve diagram of a motor control system of one embodiment of the present disclosure is shown. FIG. 4 shows how the current varies when the rotation speed of the motor 100 is adjusted from a high rotation speed to a low rotation speed. Only when the transient state detecting module 13 detects and determines that the difference between the first timing digital PWM control signal S1_T1 and the second timing digital PWM control signal S1_T2 is larger than the PWM threshold, the transient state detecting module 13 transmits the second digital PWM control signal S2 at high level to the control module 14. As a response, the control module 14 outputs a cut-off signal OFF to the second end of the first low side switch N1 to turn off the first low side switch in order to avoid the reverse current. Thus, during the time interval tr, the output current IL of the motor driving circuit 10 is zero as shown in FIG. 4. It is worth mentioning that, the first digital PWM control signal S1 can be accessed at different time points before the time interval tr or within the time interval tr to generate the first timing digital PWM control signal S1_T1 and the second timing digital PWM control signal S1_T2.

The motor control system provided by the present disclosure can accurately predict the timing when the rotation speed of the motor changes from a high rotation speed to a low rotation speed by converting a PWM control signal into a digital PWM control signal. When it is determined that the rotation speed of the motor changes from a high rotation speed to a low rotation speed, a control module in the motor control system transmits a cut-off signal to a driving module in the motor control system to avoid a reverse current. In addition, the circuit area of the motor driving circuit in the motor control system provided by the present disclosure is smaller than a traditional motor driving circuit, thus reducing the cost for developing and producing the motor driving circuit of the present disclosure.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A motor control system, comprising:
a motor driving circuit, having a first output end and a second output end, wherein the motor driving circuit includes: a control module;
a PWM signal detecting module, electrically connected to the control module, configured to receive a PWM signal and convert the PWM signal to a first digital PWM control signal;
a transient state detecting module, configured to provide a second digital PWM control signal to the control module according to the first digital PWM control signal at a first time point and the first digital PWM control signal at a second time point; and
a driving module, electrically connected to the control module, configured to receive at least one driving signal from the control module, wherein the driving module is electrically connected to the first output end and the second output end of the motor driving circuit; and a motor, electrically connected to the first output end and the second output end of the motor driving circuit, wherein the control module controls the rotation speed of the motor by using the driving module;
wherein the control module determines whether to turn off a low side switch of the driving module according to the second digital PWM control signal;
wherein the driving module includes:
a first high side switch, having a first end, a second and a third end, wherein the first end of the first high side switch is coupled to a direct voltage, the second end of the first high side switch is electrically connected to the control module to receive a first high side driving signal, and the third end of the first high side switch is electrically connected to the first output end of the motor driving circuit:
a second high side switch, having a first end, a second and a third end, wherein the first end of the second high side switch is coupled to the direct voltage, the second end of the second high side switch is electrically connected to the control module to receive a second high side driving signal from the control module, and the third end of the second high side switch is electrically connected to the second output end of the motor driving circuit;
a first low side switch, having a first end, a second and a third end, wherein the first end of the first low side switch is electrically connected to the third end of the first high side switch and the first output end of the motor driving circuit, the second end of the first low side switch is electrically connected to the control module to receive a first low side driving signal from the control module, and the third end of the first low side switch is grounded; and
a second low side switch, having a first end, a second and a third end, wherein the first end of the second low side switch is electrically connected to the third end of the second high side switch and the second output end of the motor driving circuit, and the second end of the second low side switch is electrically connected to the control module to receive a second low side driving signal from the control module;
wherein the control module determines whether to turn off the first low side switch of the driving module according to the second digital PWM control signal;
wherein the transient state detecting module includes: a converting unit;
a comparison unit, electrically connected to the converting unit; a first temporary storage unit, electrically connected to the converting unit to receive the first digital PWM control signal and to convert the first digital PWM control signal into a first timing digital PWM control signal; and
a second temporary storage unit, electrically connected to the converting unit to receive the first digital PWM control signal and to convert the first digital PWM control signal at the second time point into a second timing digital PWM control signal;
wherein the comparison unit outputs the second digital PWM control signal according to a difference between the first timing digital PWM control signal and the second timing digital PWM control signal;
wherein the second time point is larger than the first time point;
wherein the converting unit of the transient state detecting module outputs the second digital PWM control signal at high level to the control module when the second timing digital PWM control signal minus the first timing digital PWM control signal is larger than zero and also larger than a PWM threshold, such that the control module outputs a cut-off signal to the second end of the first low side switch to turn off the first low side switch.

2. The motor control system according to claim 1, wherein the transient state detecting module further includes:
a timer, configured to set a predetermined time, wherein the control module resets the second digital PWM control signal according to the predetermined time set by the timer.

3. The motor control system according to claim 1, wherein the converting unit of the transient state detecting module outputs the second digital PWM control signal at low level to the control module when the second timing digital PWM control signal minus the first timing digital PWM control signal is larger than zero but smaller than a PWM threshold, such that the control module outputs a PWM signal to the second end of the first low side switch.

4. The motor control system according to claim 1, wherein the converting unit of the transient state detecting module outputs no signal to the control module when the second timing digital PWM control signal minus the first timing digital PWM control signal is smaller than zero.

5. The motor control system according to claim 1, wherein the motor driving circuit further includes:
a position detecting module, electrically connected to a Hall sensing end of the motor driving circuit to receive a phase variation signal of the motor;
wherein the PWM signal detecting module is electrically connected to a PWM signal receiving end of the motor driving circuit to receive the PWM signal.

6. A motor driving circuit, having a first output end and a second output end electrically connected to a motor, comprising: a control module;
a PWM signal detecting module, electrically connected to the control module, configured to receive a PWM signal and to convert the PWM signal into a first digital PWM control signal;
a transient state detecting module, configured to provide a second digital PWM control signal to the control module according to the first digital PWM control signal at a first time point and the first digital PWM control signal at a second time point; and
a driving module, electrically connected to the control module, configured to receive at least one driving signal from the control module, wherein the driving module is electrically connected to the first output end and the second output end of the motor driving circuit;
wherein the control module controls the rotation speed of the motor by using the driving module;
wherein the control module determines whether to turn off a low side switch of the driving module according to the second digital PWM control signal;
wherein the driving module includes:
a first high side switch, having a first end, a second and a third end, wherein the first end of the first high side switch is coupled to a direct voltage, the second end of the first high side switch is electrically connected to the control module to receive a first high side driving signal, and the third end of the first high side switch is electrically connected to the first output end of the motor driving circuit;
a second high side switch, having a first end, a second and a third end, wherein the first end of the second high side switch is coupled to the direct voltage, the second end of the second high side switch is electrically connected to the control module receive a second high side driving signal from the control module, and the third end of the second high side switch is electrically connected to the second output end of the motor driving circuit;
a first low side switch, having a first end, a second and a third end, wherein the first end of the first low side switch is electrically connected to the third end of the first high side switch and the first output end of the motor driving circuit, the second end of the first low side switch is electrically connected to the control module to receive a first low side driving signal from the control module, and
the third end of the first low side switch is grounded; and
a second low side switch, having a first end, a second and a third end, wherein the first end of the second low side switch is electrically connected to the third end of the second high side switch and the second output end of the motor driving circuit, and the second end of the second low side switch is electrically connected to the control module to receive a second low side driving signal from the control module;
wherein the control module determines whether to turn off the first low side switch of the driving module according to the second digital PWM control signal;
wherein the transient state detecting module includes: a converting unit;
a comparison unit, electrically connected to the converting unit; a first temporary storage unit, electrically connected to the converting unit to receive the first digital PWM control signal and to convert the first digital PWM control signal into a first timing digital PWM control signal; and
a second temporary storage unit, electrically connected to the converting unit to receive the first digital PWM control signal and to convert the first digital PWM control signal at the second time point into a second timing digital PWM control signal;
wherein the comparison unit outputs the second digital PWM control signal according to a difference between the first timing digital PWM control signal and the second timing digital PWM control signal;
wherein the second time point is larger than the first time point;
wherein the converting unit of the transient state detecting module outputs the second digital PWM control signal at high level to the control module when the second timing digital PWM control signal minus the first timing digital PWM control signal is larger than zero and also larger than a PWM threshold, such that the control module outputs a cut-off signal to the second end of the first low side switch to turn off the first low side switch.

7. The motor driving circuit according to claim 6, wherein the transient state detecting module further includes: a timer, configured to set a predetermined time, wherein the control module resets the second digital PWM control signal according to the predetermined time set by the timer.

8. The motor driving circuit according to claim 6, wherein the converting unit of the transient state detecting module outputs the second digital PWM control signal at low level to the control module when the second timing digital PWM control signal minus the first timing digital PWM control signal is larger than zero but smaller than a PWM threshold, such that the control module outputs a PWM signal to the second end of the first low side switch.

9. The motor driving circuit according to claim 6, wherein the converting unit of the transient state detecting module outputs no signal to the control module when the second timing digital PWM control signal minus the first timing digital PWM control signal is smaller than zero.

10. The motor driving circuit according to claim 6, further comprising:
- a position detecting module, electrically connected to a Hall sensing end of the motor driving circuit to receive a phase variation signal of the motor;
- wherein the PWM signal detecting module is electrically connected to a PWM signal receiving end of the motor driving circuit to receive the PWM signal.

\* \* \* \* \*